United States Patent
Inoue

[11] Patent Number: 5,855,411
[45] Date of Patent: Jan. 5, 1999

[54] SEAT FOR VEHICLES

[76] Inventor: Yutaka Inoue, 11-8-503, Kosuge 4-chome, Katsushika-ku, Tokyo, Japan

[21] Appl. No.: 868,866
[22] Filed: Jun. 5, 1997

[30] Foreign Application Priority Data

Jun. 7, 1996 [JP] Japan ................................. 8-145110
Apr. 3, 1997 [JP] Japan ................................. 9-085316

[51] Int. Cl.$^6$ ................................................... B60N 2/42
[52] U.S. Cl. ............................ 297/216.19; 297/216.18
[58] Field of Search ................................ 297/322, 325, 297/329, 216.1, 216.16, 216.18, 216.19

[56] References Cited

U.S. PATENT DOCUMENTS 2,818,909  1/1958  Burnett .
3,998,291  12/1976  Davis .

FOREIGN PATENT DOCUMENTS

1904687  9/1970  Germany .

Primary Examiner—Milton Nelson, Jr.
Attorney, Agent, or Firm—Kane, Dalsimer, Sullivan, Kurucz, Levy, Eisele and Richard, LLP

[57] ABSTRACT

A seat for vehicles having an occupant protecting function which immediately responds to impact force at the time of a collision and which is simple and inexpensive in structure. In the seat for vehicles comprising a seat portion and a back portion, a slider having a forwardly and upwardly inclined surface and a transverse horizontal pivotal shaft are attached to a lower side of the seat portion; a horizontal guide means for frontwardly/rearwardly guiding the pivotal shaft is provided on a vehicle body; and slider running-on means is further provided on the vehicle body so that the inclined surface of the slider runs on to the slider running-on means when the seat moves forwardly.

5 Claims, 12 Drawing Sheets

SEAT FOR VEHICLES

BACKGROUND OF THE INVENTION

The present invention relates to a seat for vehicles which is inclined to protect an occupant at the time of collision of a vehicle.

Such a seat for vehicles is known from JP-A-06-183292. In this seat for vehicles, a front section of a seat portion is pivotally attached to a horizontal shaft, and a rear section of the seat portion is supported to an actuator rod and pulled down by a coiled spring. When a vehicle collides with an object and a signal greater than a predetermined value is transmitted from a collision sensor, the actuator operates through a control unit to pull back the actuator rod. Because the supporting of the rear section of the seat portion is eliminated as a result, the rear section of the seat portion is pulled down by the coiled spring so that the seat rotates around the horizontal shaft so as to be inclined. Accordingly, the occupant assumes the posture of holding his/her knees in his/her arms so that the occupant is protected from the shock load due to the collision.

In the occupant protecting system in such a seat for vehicles, a relatively large amount of time is required for completion of inclination of the seat after the collision due to the necessity of including the response time of a collision sensor, the arithmetic operation time of a control unit, the operating time of an actuator, the inclining operation time of the seat, etc. Accordingly, it is difficult to incline the seat in a period (tens of milliseconds) from a point of time when the vehicle collides with an object to a point of time when the occupant collides with front glass of the vehicle.

Furthermore, the occupant protecting system is complex and very expensive in structure because the system requires a collision sensor, a control unit, two actuators and coiled springs.

SUMMARY OF THE INVENTION

Therefore, an object of the present invention is to provide a seat for vehicles having an occupant protecting function which immediately responds to an impact force at the time of a collision and which is simple and inexpensive in structure.

In order to achieve the above object, a seat for vehicles is provided comprising a seat portion and a back section, wherein a slider having a forwardly and upwardly inclined surface and a transverse horizontal pivotal shaft are attached to a lower side of the seat portion, and a horizontal guide means for frontward/rearward guiding of the pivotal shaft is provided on a vehicle body, and a slider running-on means is further provided on the vehicle body so that the inclined surface of the slider runs on to the slider running-on means when the seat moves forwardly.

The seat for vehicles according to the present invention is rotated so as to be inclined on the basis of inertia force at the time of a collision, that is, on the basis of the forward movement of the seat. Accordingly, because the seat immediately responds to the shock at the time of a collision, no time lag occurs. Further, because it is not necessary to provide any special device such as an actuator for driving the seat to rotate, a sensor, etc., not only is the operation of the seat secure, but also the structure of the seat is simple.

According to another aspect of the present invention, a seat for vehicles is provided comprising a seat portion and a back section, wherein a slider having a forwardly and upwardly inclined surface is attached to a lower side of the seat portion and support members are pivotally attached to the lower side of the seat portion through a transverse horizontal pivotal shaft, and a horizontal guide means for frontwardly/rearwardly guiding of the support members is provided on a vehicle body, and a slider running-on means is further provided on the vehicle body so that the inclined surface of the slider runs on to the slider running-on means when the seat moves forwardly.

According to a further aspect of the present invention, a seat for vehicles is provided comprising a seat portion and a back portion, wherein support members are pivotally attached on a lower side of the seat portion through a transverse horizontal pivotal shaft and a forwardly and upwardly inclined means for guiding the support members is provided on a vehicle body.

According to a still further aspect of the present invention, a seat for vehicles is provided comprising a seat portion and a back portion, wherein support members are pivotally attached to a lower side of the seat portion through a transverse horizontal pivotal shaft, and a horizontal means extending frontwardly/rearwardly for guiding the support members is provided on a vehicle body and the support members and the back section are connected to each other through rope members guided through pulleys fixed to the vehicle body.

According to another aspect of the present invention, a seat for vehicles is provided comprising a seat portion and a back portion, wherein sliders respectively having convexly curved slide surfaces are attached on a lower side of the seat portion, guide members respectively having concavely curved surfaces for receiving and guiding the sliders are attached on the vehicle body, and the sliders have curved long holes so that a transverse horizontal guide pin fixed to the guide members is loosely fitted into the hole.

Further, a slide prevention means is provided so that the seat is prevented from moving forwardly in the normal state except in a collision state. In this case, a slider or a member moving together with the slider is held by a pin projecting from the guide surface thereof and urged by a spring so as to be prevented from moving forwardly. When a predetermined amount of inertia force is generated in the slider, the slider or the member moving together with the slider climbs over the projection against the spring so as to be able to move forwardly.

Further, a rotation prevention means is provided so that the seat is prevented from rotating backwardly at the time of acceleration. In this case, a pin-like member is attached to either the seat or the vehicle body in a position far from the pivotal shaft, and a spring is attached to the other of said seat or vehicle body so as to hold the pin-like member while pressing the pin-like member from its opposite sides.

Further, a stopper is provided for limiting the rotation of the seat.

DESCRIPTION OF THE PREFERRED EMBODIMENTS

Embodiments of a seat for vehicles according to the present invention will be described below in detail with reference to the drawings.

Figure 1:
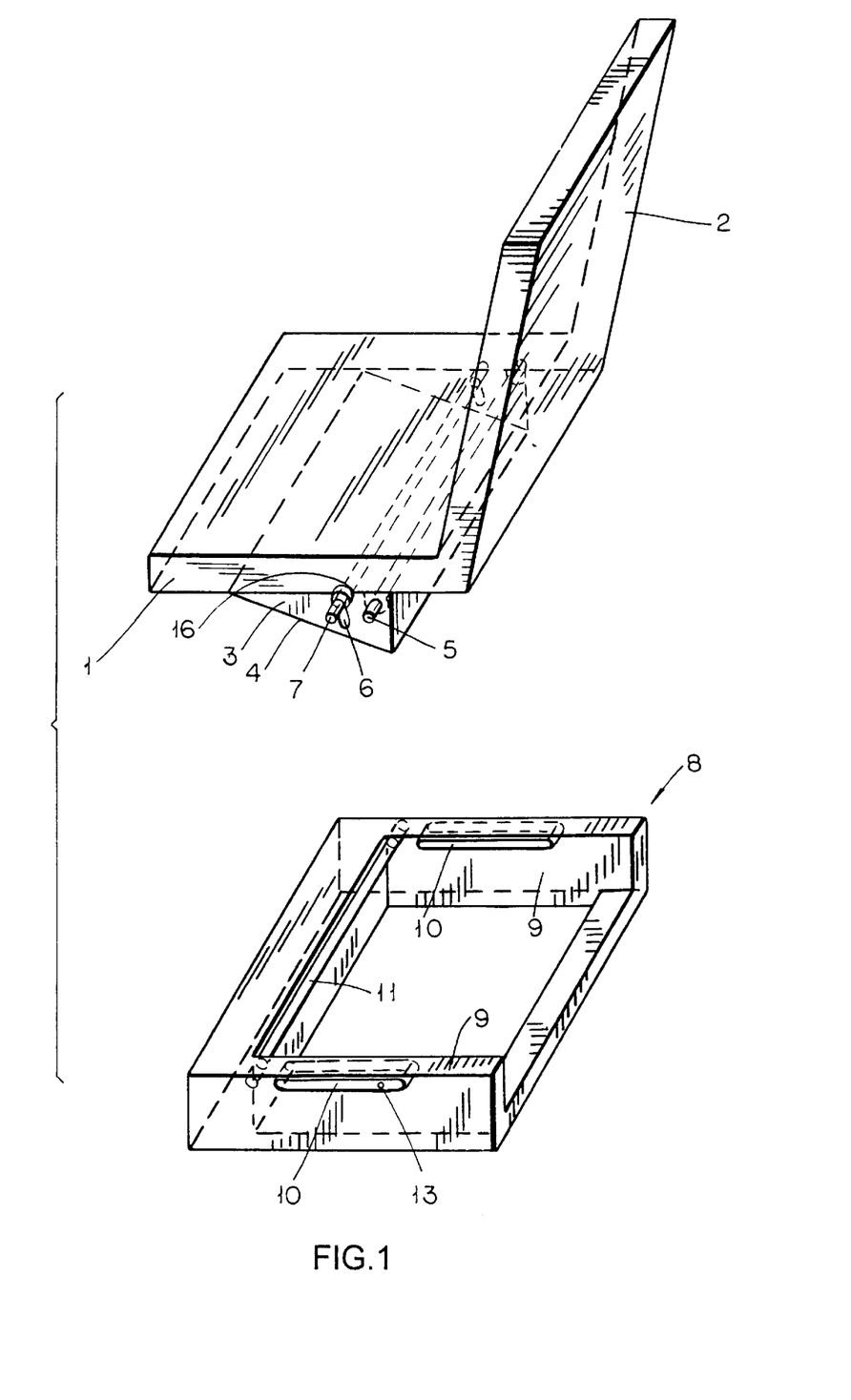
FIG. 1 is an exploded perspective view schematically showing a seat for vehicles according to a first embodiment of the present invention.
Figure 2:
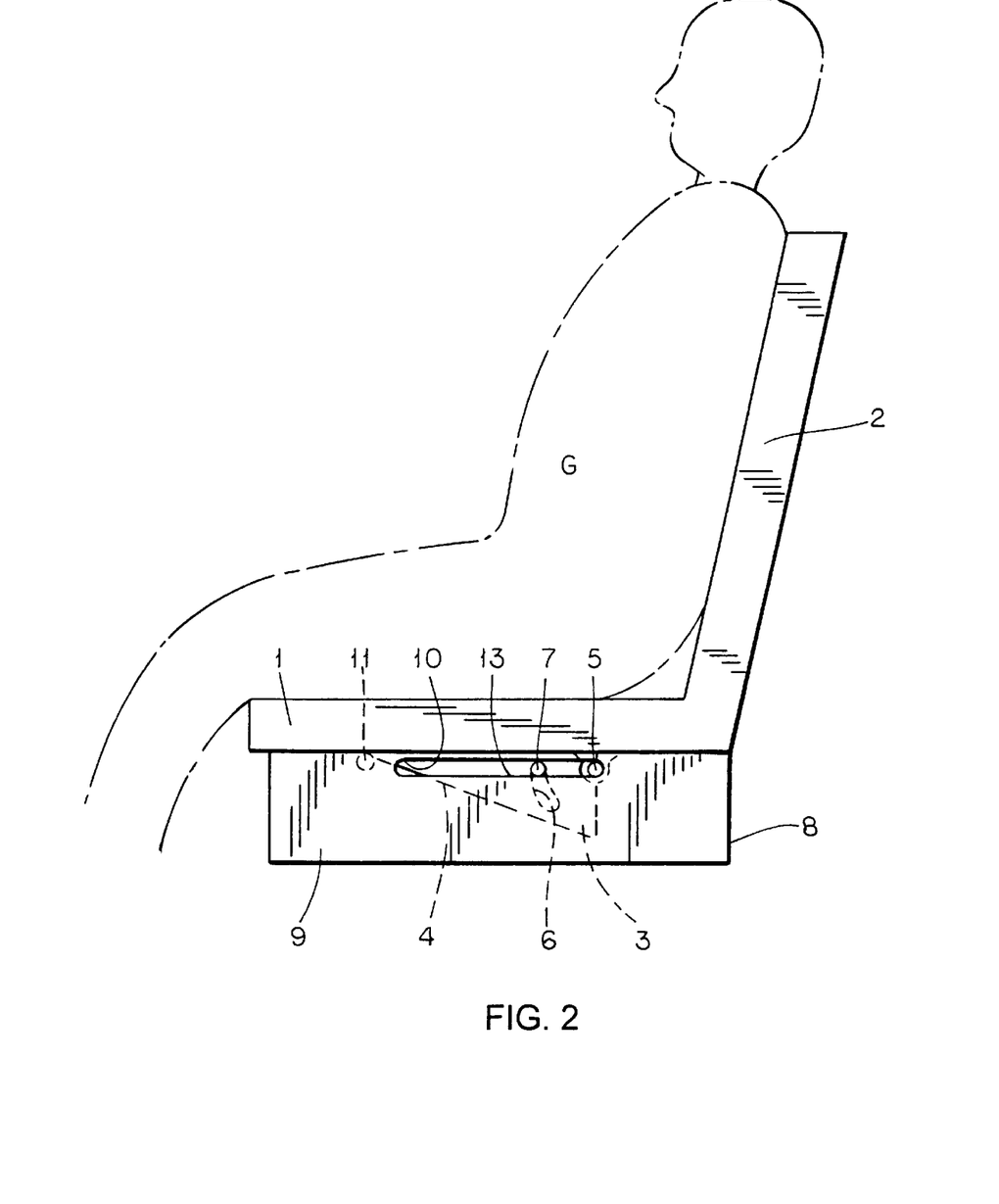
FIG. 2 is a side view of the seat for vehicles depicted in FIG. 1.

FIGS. 1 and 2 are an exploded perspective view and a side view schematically showing a seat for vehicles according to a first embodiment of the present invention. The seat comprises a seat portion 1 and a back portion 2. A slider 3 shaped like a horizontally-disposed triangular pole is fixed under a frame of the seat portion 1. The slider 3 has a surface 4 which is inclined downwardly from the front to the rear of the seat. A horizontal pivotal shaft 5 is attached to a rear section of the slider 3 so as to project from the slider 3 to the opposite sides of the latter. The pivotal shaft 5 forms a seat rotation shaft for inclining the seat backwardly at the time of collision of a vehicle (see FIG. 5).

The slider 3 further has a slot 6 parallel to the pivotal shaft 5. The slot 6 is formed so as to be curved along a circular arc around the pivotal shaft 5 (see FIG. 2). A bar-like stopper 7 is loosely fitted into the curved slot 6. An upper end of the slot 6 is located near the stopper 7 in the normal state (see FIG. 2). When the seat reaches the backward inclination position, a lower end of the slot 6 abuts on the stopper 7 so that the backward inclination of the seat is limited (see FIG. 5).

Below the seat portion 1, a quadrilateral frame 8 is fixed to a floor of a vehicle body. The frame 8 is mounted on the vehicle body directly or mounted on movable rails of a known frontward/rearward seat slide adjusting mechanism fixed to the vehicle body. The frame 8 has horizontal guide grooves 10 which are formed respectively in side plates 9 of the frame 8 so as to extend frontwardly/rearwardly. The pivotal shaft 5 of the slider 3 and the bar-like stopper 7 are loosely fitted into the guide grooves 10. Further, a running-on bar 11 is horizontally attached to the side plates 9 of the frame 8 so as to be located in the front of the guide grooves 10. At the time of collision of the vehicle, the slider 3 runs on to the slider running-on bar 11.

Figure 3:
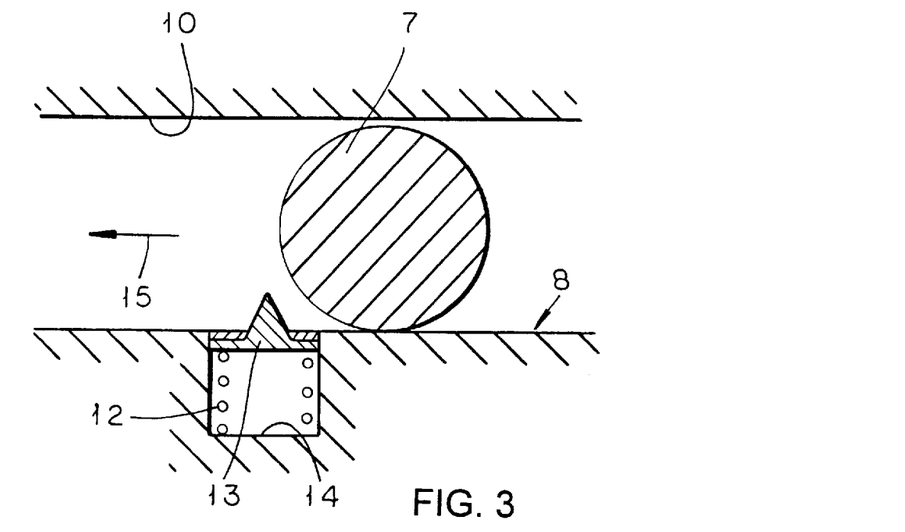
FIG. 3 is a partly enlarged sectional view showing a slide prevention means.

FIG. 3 shows a slide prevention means for preventing the seat from sliding forwardly when the vehicle is braked normally. The slide prevention means is provided just in the front of the stopper 7 and is constituted by a projection 13 urged by a spring 12. The spring 12 is inserted into a recess section 14 of the frame 8 to urge the projection 13 upwardly. As a result, the projection 13 is entered into the horizontal guide groove 10 to prevent the stopper 7 from sliding forwardly. When vehicle deceleration greater than a predetermined value occurs, the stopper 7 pushes down the projection 13 against the spring 12 and climbs over the projection 13 so as to move forwardly, that is, in the direction of the arrow 15, along the guide groove 10.

Figure 4:
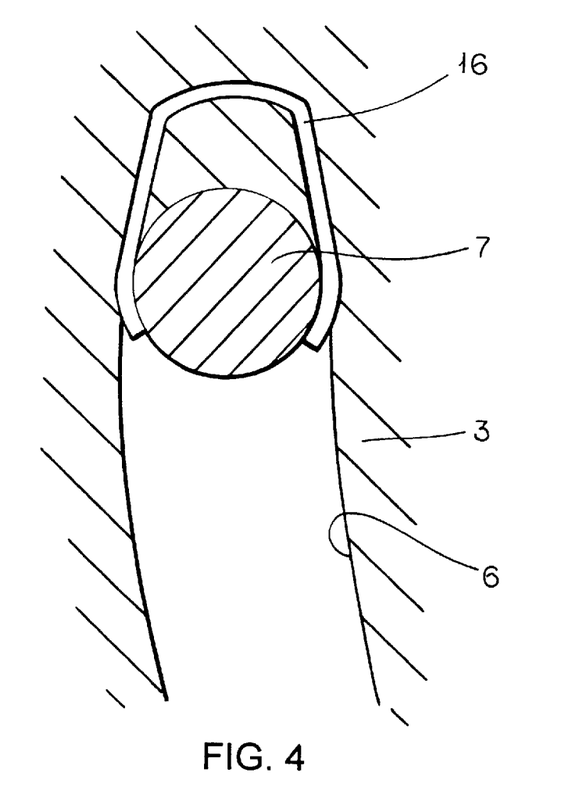
FIG. 4 is a partly enlarged sectional view showing a rotation prevention means.

FIG. 4 shows a rotation prevention means for preventing the seat from being inclined backwardly at the time of normal vehicle acceleration. The rotation prevention means is constituted by a spring 16 which is fixed to the seat 1 or to the slider 3 in order to hold the stopper 7 from the opposite sides of the latter. The spring 16 prevents the seat from being inclined backwardly at the time of normal vehicle acceleration because the seat 1 or the slider 3 is connected to the stopper 7 inserted and held in the guide grooves 10 of the frame 8. If a large amount of force to incline the seat backwardly is generated, for example, when the vehicle is run into from behind, this force overcomes the force of the spring 16 clipping the stopper 7 so that the spring 16 is separated from the stopper 7 to thereby make it possible the seat to incline backwardly.

The operation of the seat for vehicles according to the first embodiment will be described below. The seat position during the normal operation of a vehicle is shown in FIG. 2. When the vehicle is braked, the seat and an occupant sitting on the seat are subjected to inertia force. The seat, however, does not move forwardly even in the case where the vehicle is braked suddenly. This is because the slide prevention means, e.g., the projection 13 (see FIG. 3) prevents the seat from sliding unless the deceleration reaches a predetermined value.

Figure 5:
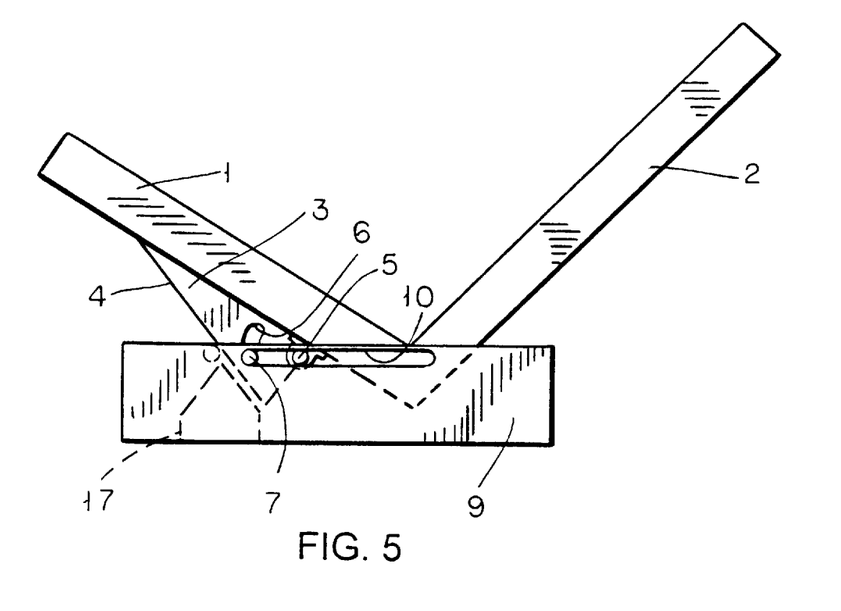
FIG. 5 is a view showing a state of the seat for vehicles depicted in FIG. 1 at the time of a front-end collision.

When deceleration greater than the predetermined value occurs at the time of a front-end collision due to an accident, the occupant and the seat are urged thrown forwardly by momentary so that the stopper 7 pushes down the projection 13 against the spring 12, climbs over the projection 13 and moves forwardly along the guide grooves 10. As a result, not only does the inclined surface 4 of the slider 3 run onto the bar 11, but also the spring 16 fixed to the slider 3 is separated from the stopper 7, so that the seat rotates clockwise around the pivotal shaft 5 while moving forwardly as shown in FIG. 5. When the seat reaches a predetermined backward inclination position, the lower end of the slot 6 abuts on the stopper 7 to prevent the seat from rotating further. In this manner, the rotation of the seat at the time of a collision causes the upward inclination of the seat portion 1 and the increase of friction between the seat portion 1 and the occupant, so that the function of the seat portion 1 supporting the occupant is increased to thereby prevent the occupant from being thrown forwardly.

Further, at the time of vehicle acceleration, the seat does not rotate around the pivotal shaft 5 even in the case where the occupant is subjected to recoil. This is because the center of gravity G of the occupant is located in a position further forward than the position of the pivotal shaft 5 in terms of the longitudinal direction of the vehicle (see FIG. 2), and the rotation prevention means 16 (see FIG. 4) serves to prevent the seat from rotating.

That is, in a state in which the occupant sits on the seat, the position of the center of gravity G of the occupant in the longitudinal direction of the vehicle is substantially constant regardless of the physique of the occupant. Because the center of gravity G is located in a position further forward than the position of the pivotal shaft 5 as described above, the center of gravity G of the occupant normally serves to prevent the seat from rotating. Further, because the aforementioned spring 16 supports the slider 3 and the stopper 7 to connect the slider 3 and the stopper 7 to each other and, accordingly, the spring 16 supports the seat portion 1 and the frame 8 to connect the seat portion 1 and the frame 8 to each other, the spring 16 also serves to prevent the seat from rotating. Accordingly, the seat is prevented from being inclined backwardly at the time of vehicle acceleration, for example, at the time of sudden vehicle acceleration.

Figure 6:
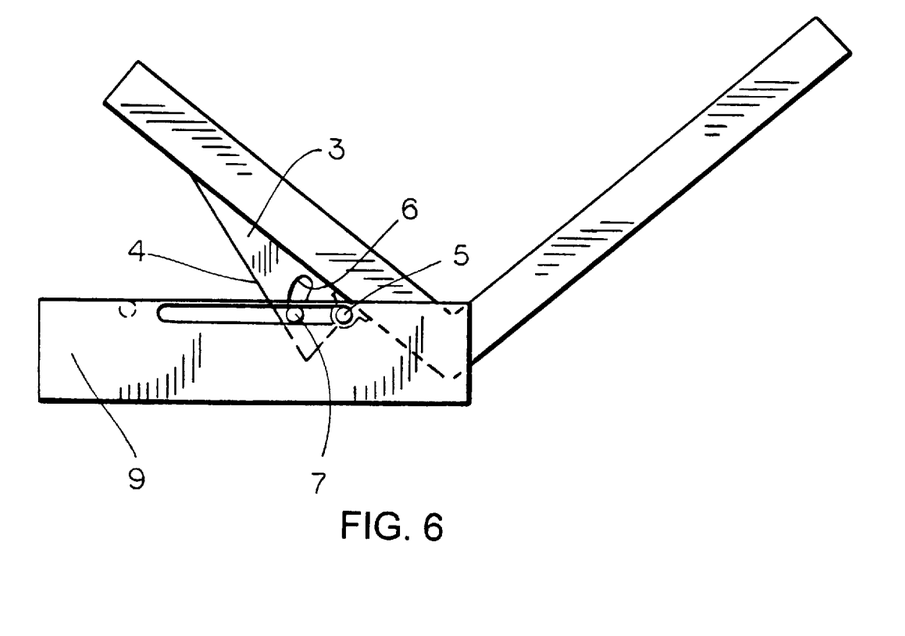
FIG. 6 is a view showing a state of the seat for vehicles depicted in FIG. 1 at the time of a rear-end collision.

When the vehicle is hit by another vehicle from behind, the upper half of the body of the occupant sitting on the seat pushes the back portion 2 of the seat backwardly by recoil. Accordingly, the spring 16 is separated from the stopper 7, so that the seat rotates clockwise around the pivotal shaft 5 so as to be inclined backwardly (see FIG. 6). In this occasion, the lower end of the long hole 6 abuts on the stopper 7 to prevent the seat from rotating further.

In this manner, when the vehicle is hit by another vehicle from behind, the seat rotates so as to be inclined backwardly to thereby reduce or absorb the shock load transmitted to the occupant due to the rear-end collision. Accordingly, the so-called neck rebounding motion in which the head of the occupant bounces off a head rest at the time of a rear-end collision is avoided so that the occupant can be prevented from suffering whiplash.

Although the seat for vehicles according to the first embodiment has been described above based upon the case where the inclined surface 4 is a flat surface, the invention can also be applied to the case where the inclined surface 4 is a convexly curved surface or to the case where the inclined surface 4 is shaped to be a combination of a flat surface and a curved surface. Further, the inclination angle of the inclined surface 4 can be selected suitably. Further, the inclined surface 4 may be formed over the whole width of the slider 3 or may be formed only on one part of the width of the slider, that is, only on the opposite sides of the slider selectively.

Further, the pivotal shaft 5 may be supported so as to be rotatable or may be fixed to the slider 3. The pivotal shaft 5 and the stopper 7 may be connected to each other by a connection bar. Further, the bar 11 may have a rotation roller in order to reduce friction with respect to the inclined surface 4.

Further, the rotation of the seat at the time of sudden acceleration of the vehicle can be prevented by a simple operation of suitably setting the position of the pivotal shaft 5 relative to the center of gravity G of the occupant. Accordingly, the spring 16 is not always required.

Further, as represented by the two-dot chain line in FIG. 5, a rubber block 17 may be provided in the frame 8 as a substitute for the stopper 7 for stopping the rotation of the seat or in addition to the stopper 7. The slider 3 or the seat portion 1 abuts on the block 17.

Figure 7:
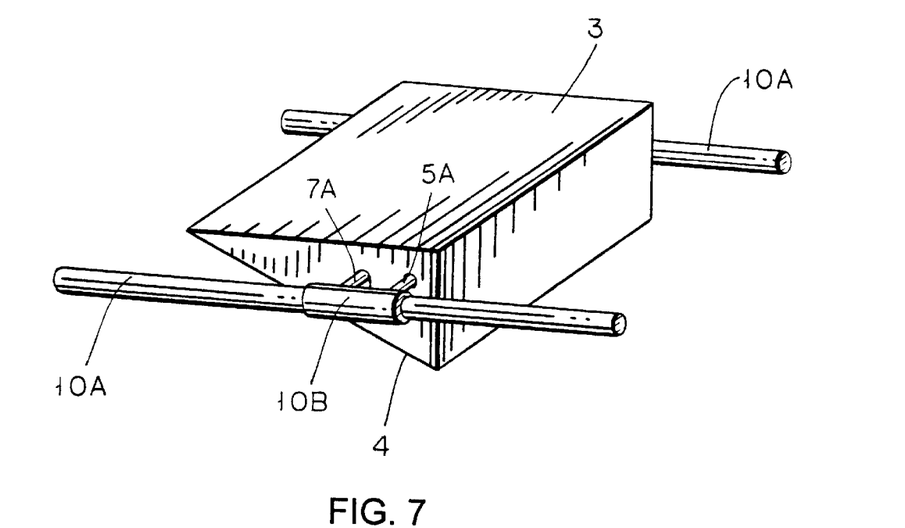
FIG. 7 is a perspective view showing a modified example of a horizontal guide means for a pivotal shaft.

The horizontal guide means for guiding the pivotal shaft 5 in the longitudinal direction of the vehicle is not limited to the guide grooves 10. For example, as shown in FIG. 7, the guide means may be constituted by horizontal guide bars 10A extending frontwardly/rearwardly on the opposite sides of the slider 3 and slide members 10B slidable on the guide bars 10A. In this case, the pivotal shaft 5A is attached to the slide members 10B. Further, the stopper 7A may be attached to the slide members 10B.

Although each of the guide bars 10A and slide members 10B constituting the guide means depicted in FIG. 7 is circular in cross section, it may have another suitable shape such as a quadrilateral. Further, shaft bearings may be disposed on the inside of the slide members 10B so that the slide members 10B can slide smoothly.

A second embodiment shown in FIGS. 8 and 9 will be described below. In the second embodiment, the slider 3 is fixed to the lower side of the seat portion 1 so that the slider 3 runs on to the bar 11 attached to the frame 8 in the same manner as in the first embodiment.

Substantially quadrilateral support members 18 are disposed under the seat portion 1 so as to be pivoted on the pivotal shaft 5. The support members 18 have rollers 19 at their lower ends so as to be movable along the respective guide grooves 10 by the rollers 19. The stopper 7 is fixed to support members 18 and inserted in the slot 6 formed in the slider 3.

In the second embodiment, at the time of a collision of the vehicle, the support members 18 move forwardly along the guide grooves 10 through the rollers 19, and the inclined surface 4 runs on to the bar 11 so that the seat rotates around the pivotal shaft 5. Further, when the vehicle is run into from behind, the seat rotates clockwise around the pivotal shaft 5 so as to be inclined backwardly.

Figure 8:
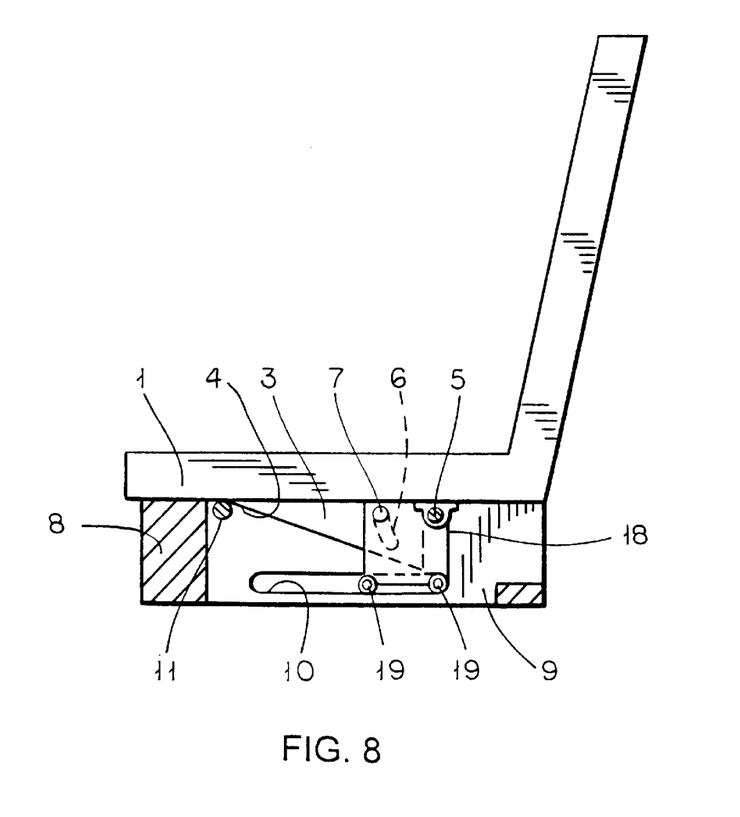
FIG. 8 is a side view schematically showing a seat for vehicles according to a second embodiment of the present invention.
Figure 9:
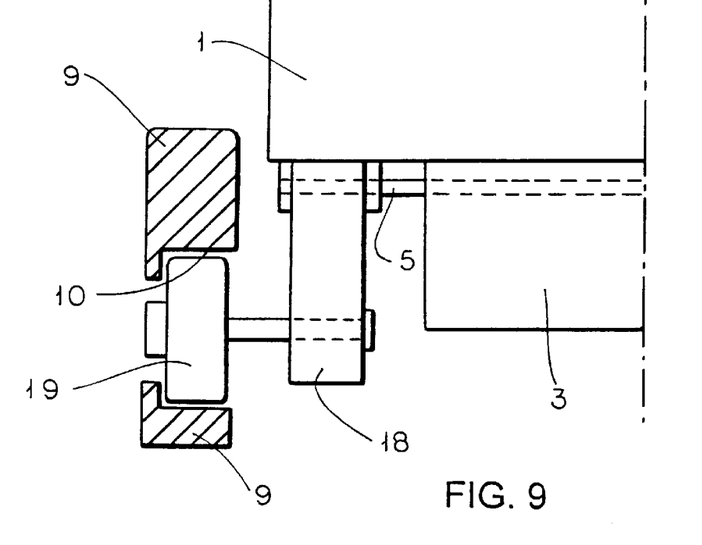
FIG. 9 is a rear view of the seat and shows a guide means for a support member.
Figure 10:
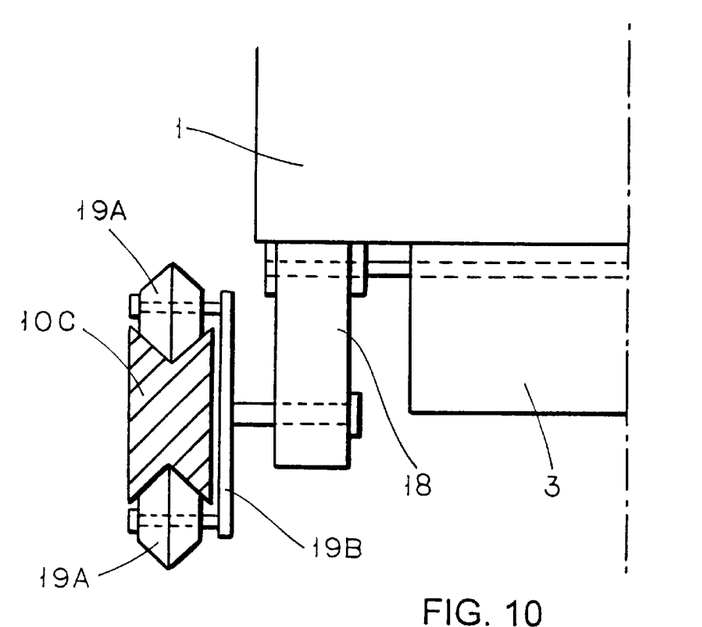
FIG. 10 is a view showing a modified example of the guide means for the support member.

Although the embodiment shown in FIGS. 8 and 9 has been described based upon the case where the horizontal guide means for guiding the support members 18 in the longitudinal direction of the vehicle is constituted by guide grooves 10 and rollers 19, the invention can be applied to another structure. For example, as shown in FIG. 10, rails 10C may be substituted for the guide grooves 10. For example, the rails 10C are attached to the floor of the vehicle indirectly through the side plates 9 or directly by a method not shown. The rollers 19A run along upper and lower V-shaped surfaces of each of the rails 10C. The rollers 19A are connected to the support members 18 through arms 19B respectively.

The means for guiding the support members 18 are constituted by the rails 10C and the rollers 19A running along the rails 10C may be formed by another structure. For example, a surface may be formed only on the upper side of each of the rails 10C while the lower portion of the rail is held by the arm 19B in order to prevent the roller 19A from dropping out of the rail. Further, the rail 10C may be C-shaped in cross section so that the roller 19A rotates in the rail 10C.

Figure 11:
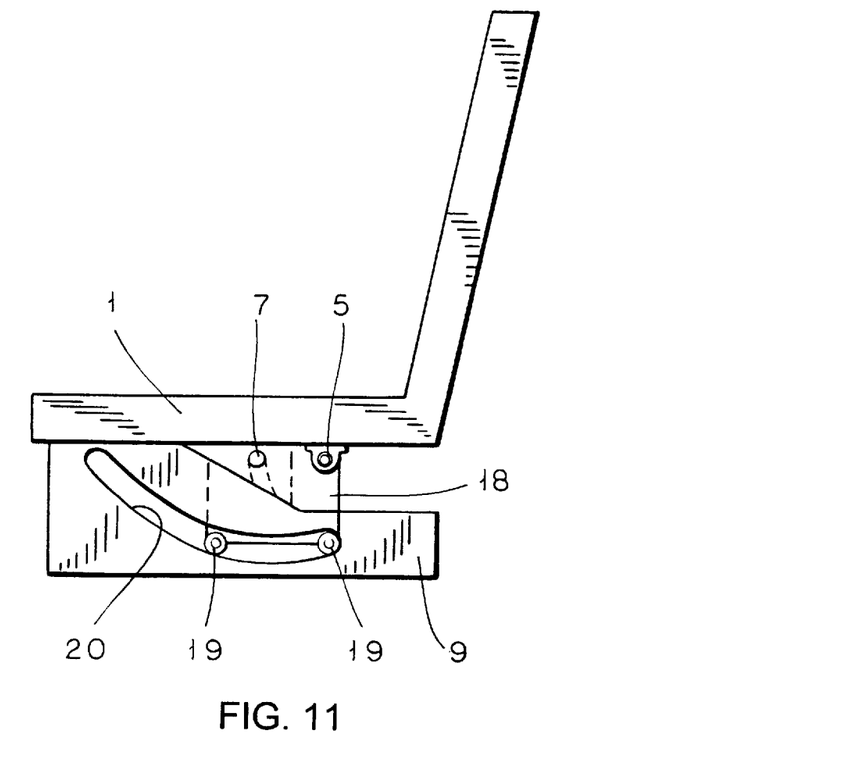
FIG. 11 is a side view schematically showing a seat for vehicles according to a third embodiment of the present invention.
Figure 12:
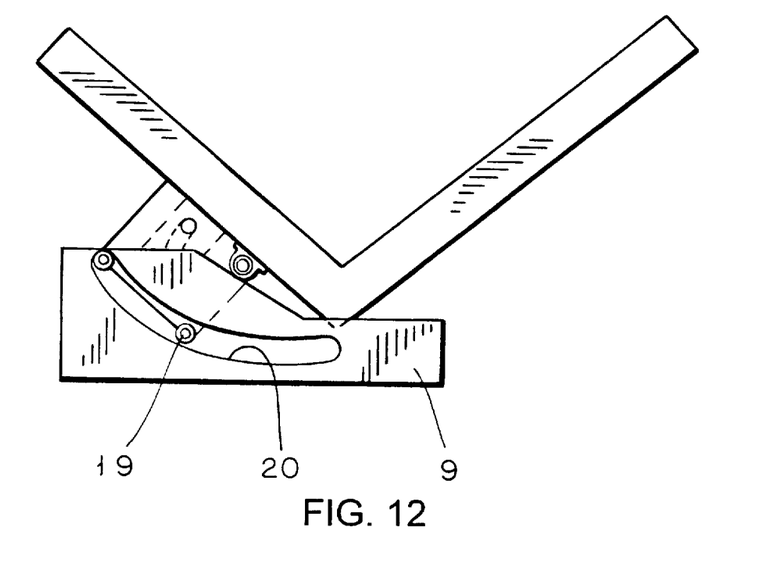
FIG. 12 is a view showing a state of the seat for vehicles depicted in FIG. 11 at the time of a front-end collision.
Figure 13:
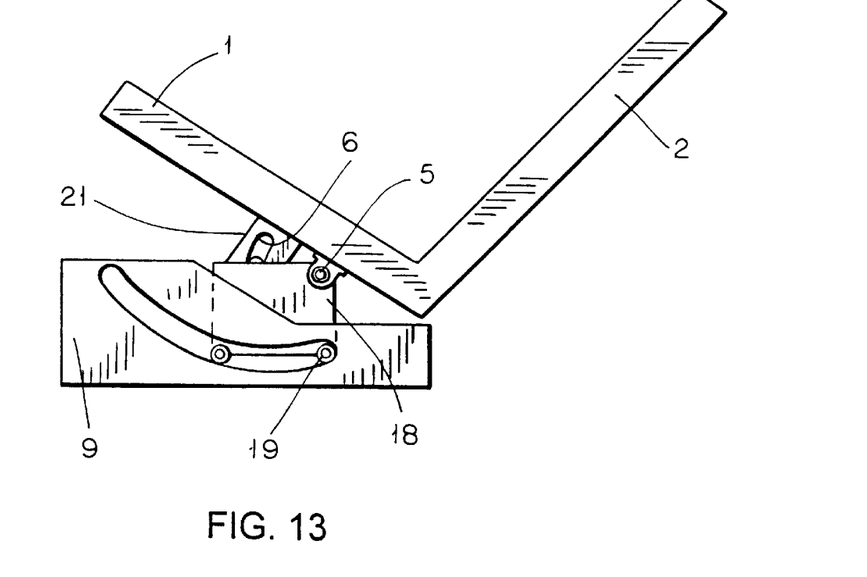
FIG. 13 is a view showing a state of the seat for vehicles depicted in FIG. 11 at the time of a rear-end collision.

FIGS. 11 to 13 show a third embodiment of the present invention. Also in the third embodiment, the substantially quadrilateral support members 18 are disposed under the seat portion 1 so as to be pivoted on the pivotal shaft 5. The stopper 7 and the rollers 19 are attached to the support members 18. The third embodiment is, however, different from the second embodiment in that guide grooves 20 for rollers 19 are inclined so as to ascend forwardly. Further, the long hole 6 is formed in a member 21 (see FIG. 13) separately provided and fixed to the lower side of the seat portion 1.

In the third embodiment, at the time of a collision, the rollers 19 are moved along the upslope guide grooves 20 by the forward momentum of the occupant and the seat, so that the seat is inclined backwardly as shown in FIG. 12. When the vehicle is run into from behind, the seat is rotated around the pivotal shaft 5 by the backward momentum of the upper half of the body of the occupant as shown in FIG. 13. In this occasion, the support members 18 and the running rollers 19 are not moved so as to be left in place.

Although FIGS. 11 to 13 show the case where the guide grooves 20 are curved, the invention may be applied to the case where the guide grooves 20 are linear.

Figure 14:
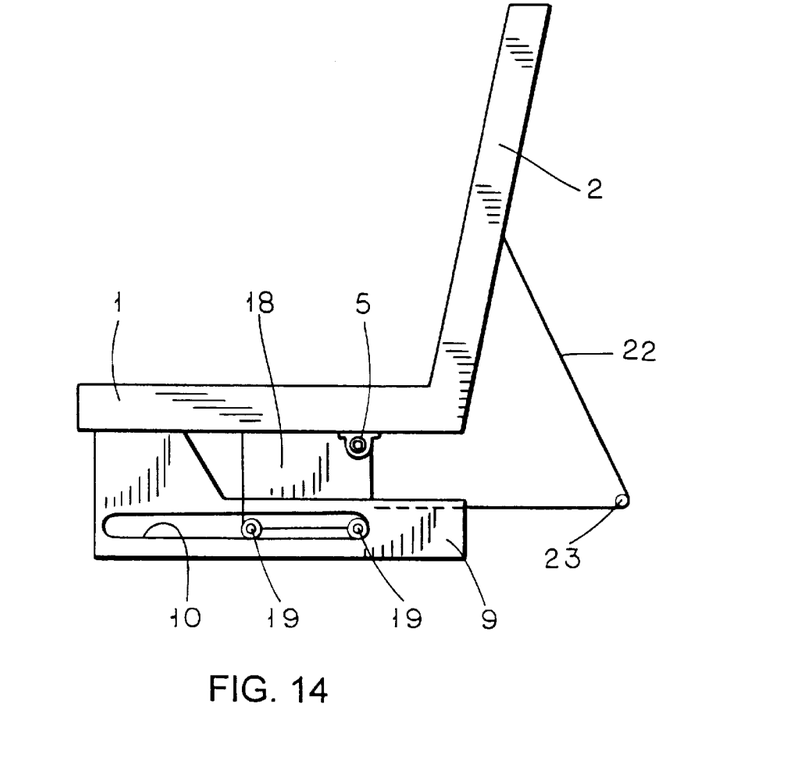
FIG. 14 is a side view schematically showing a seat for vehicles according to a fourth embodiment of the present invention.
Figure 15:
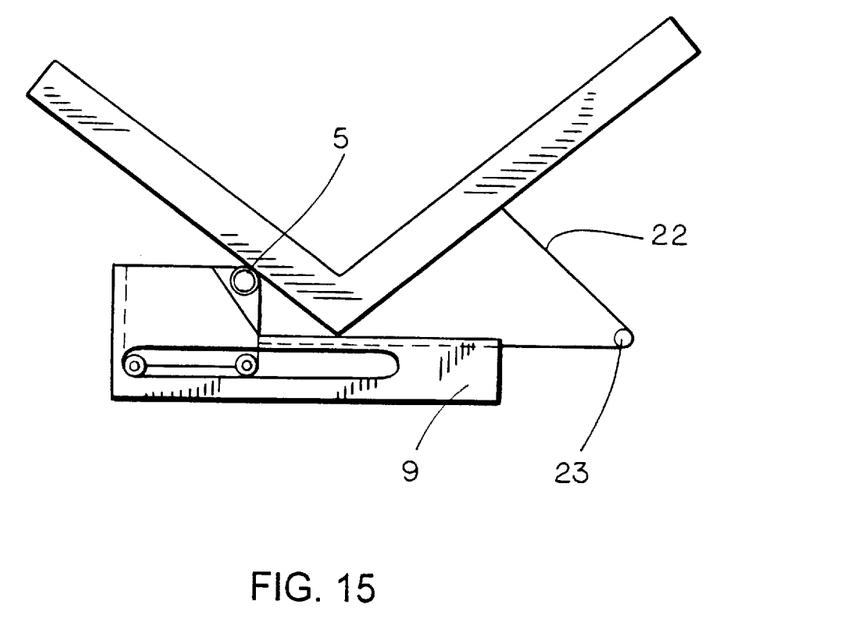
FIG. 15 is a view showing a state of the seat for vehicles depicted in FIG. 14 at the time of a front-end collision.

FIGS. 14 and 15 show a seat according to a fourth embodiment of the present invention. In this embodiment, the seat is inclined backwardly not by means of the bar, inclined guide grooves, etc., but by means of rope members 22. The rope members 22 have one of their ends connected to the respective support members 18 and their other ends connected to the back portion 2 through pulleys 23 fixed to the vehicle body. In this embodiment, the guide grooves 10 are formed horizontally in the side plates 9, while the slider and bar are not provided under the seat portion 1.

When forward momentum acts on the seat at the time of a collision, the respective support members 18 move along the guide grooves 10 through the rollers 19. At the same time, the support members 18 pull the back portion 2 through the respective rope members 22, so that the seat rotates around the pivotal shaft 5 so as to be inclined backwardly.

When the vehicle is run into from behind, the upper half of the body of the occupant pushes the back section 2 backwardly by recoil in the same manner as in the aforementioned embodiments, so that the seat rotates around the pivotal shaft 5 so as to be inclined backwardly. In this occasion, the rope members 22 are loosened.

The guide means for guiding the support members 18 in the longitudinal direction of the vehicle in the third and fourth embodiments of the present invention is formed as shown in FIG. 9. The guide means may be, however, formed as described above with reference to FIG. 10.

Figure 16:
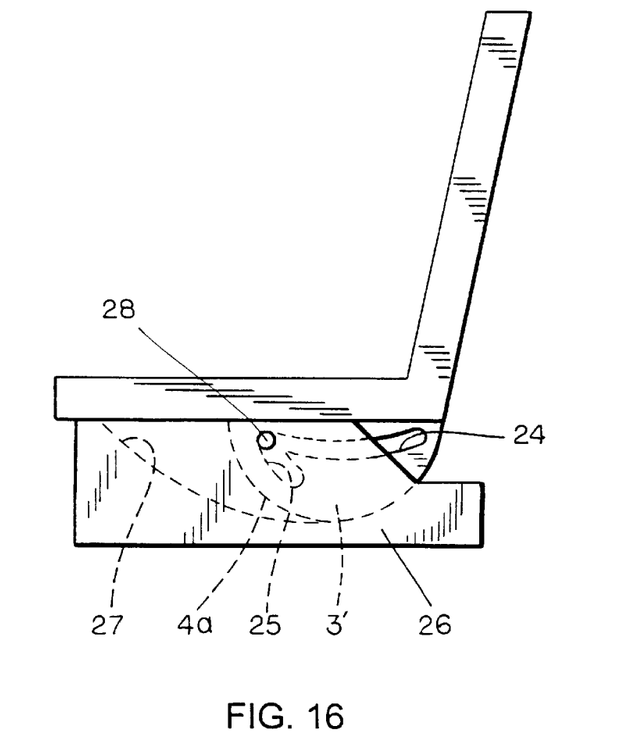
FIG. 16 is a side view schematically showing a seat for vehicles according to a fifth embodiment of the present invention.
Figure 17:
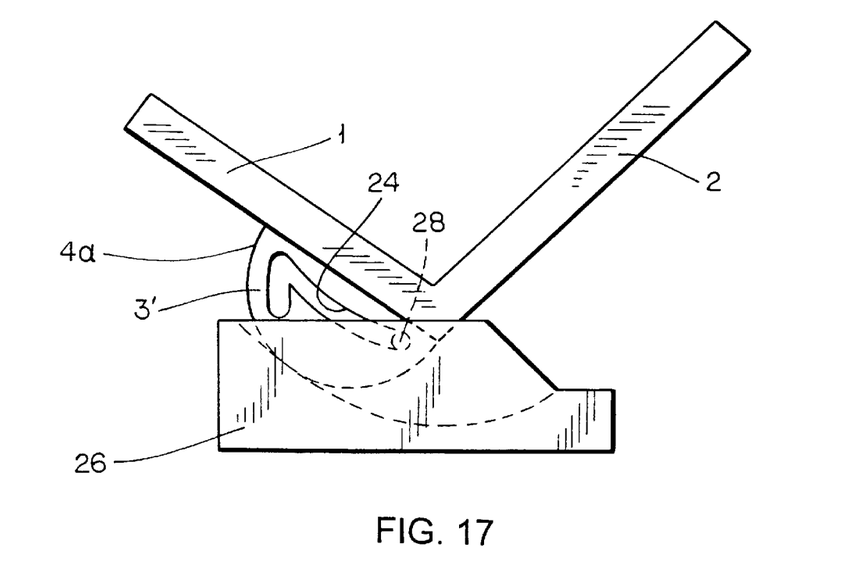
FIG. 17 is a view showing a state of the seat for vehicles depicted in FIG. 16 at the time of a front-end collision.
Figure 18:
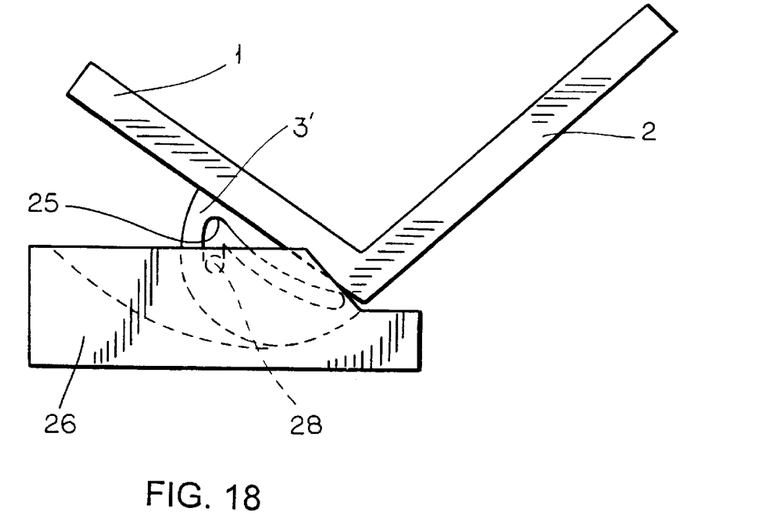
FIG. 18 is a view showing a state of the seat for vehicles depicted in FIG. 16 at the time of a rear-end collision.

FIGS. 16 to 18 are schematic views showing a seat for vehicles according to a fifth embodiment of the present invention. A slider 3' having a convexly curved slide surface such as a circular arc-shaped slide surface 4a is fixed to a seat frame not shown. A curved long hole 24 and a curved short hole 25 connected to an end of the long hole 24 are formed in the slider 3'.

Reference numeral 26 designates a guide fixed to the vehicle body. The guide 26 has a concavely curved guide surface 27 for receiving and guiding the slider 3', and a horizontal guide pin 28 inserted in the long hole 24 of the slider 3'. Further, a slide prevention means (see FIG. 3) not shown is provided between the guide surface 27 and the slide surface 4a of the slider 3'.

The guide 26 is attached to a known frontward/rearward slide adjusting mechanism fixed to the vehicle body. The frontward/rearward slide adjusting mechanism has fixed rails which are fixed to the vehicle body, and movable rails which are slidable on the fixed rails. The guide 26 is fixed to the movable rails. The guide 26 may be, however, fixed to the vehicle body directly.

The slider 3' and the guide 26 are disposed on the opposite sides of the seat.

The operation of the seat for vehicles according to the fifth embodiment will be described below. When the vehicle runs normally, the seat is in the position as shown in FIG. 16. When the vehicle is braked, the seat and the occupant sitting on the seat are subjected to forward inertia force by deceleration. Even in the case where inertia force due to sudden braking acts, the sliders 3' do not move forwardly because the sliders 3' are held by the slide prevention means (see FIG. 3) projecting from the respective guide surfaces 27.

When deceleration greater than a predetermined value occurs at the time of a collision due to an accident, the sliders 3' climb over the slide prevention means (see FIG. 3) and move forwardly along the guide surfaces 27. In this occasion, the long holes 24 formed in the sliders 3' and the horizontal pin 28 fixed to the guides 26 correct the motion of the sliders 3'. As a result, the seat, together with the occupant, rotates backwardly while moving forwardly as shown in FIG. 17.

In this manner, the seat rotates so as to be inclined backwardly to thereby prevent the occupant from being thrown forwardly.

Figure 19:
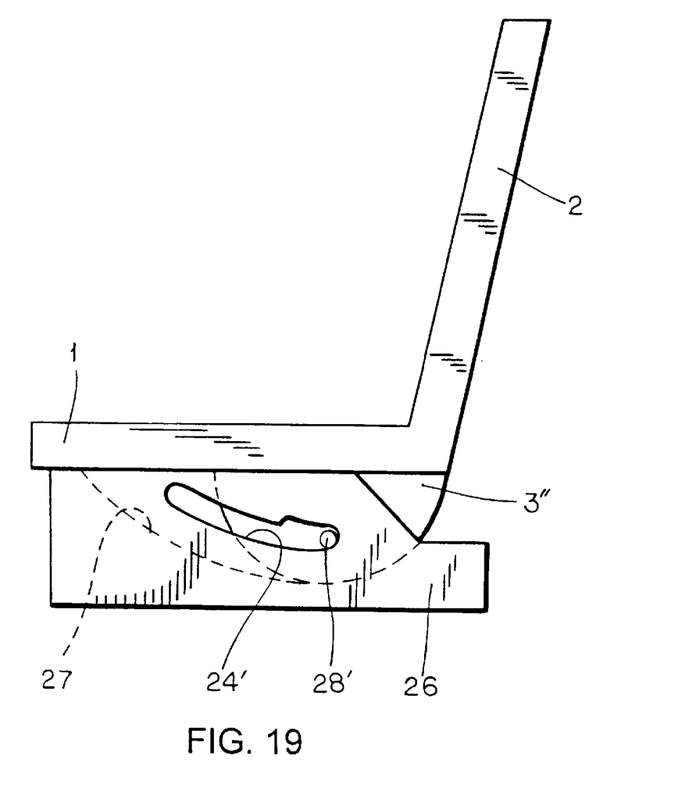
FIG. 19 is a side view schematically showing a seat for vehicles according to a sixth embodiment of the present invention.
Figure 20:
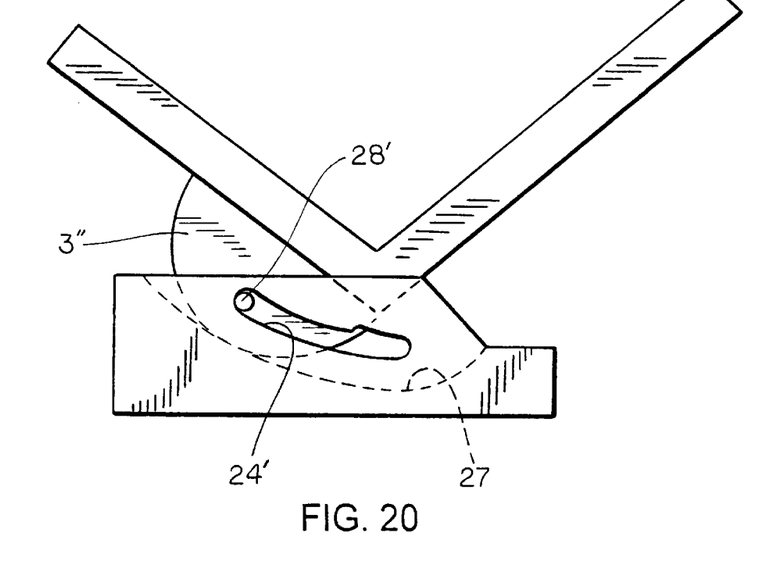
FIG. 20 is a view showing a state of the seat for vehicles depicted in FIG. 19 at the time of a front-end collision.
Figure 21:
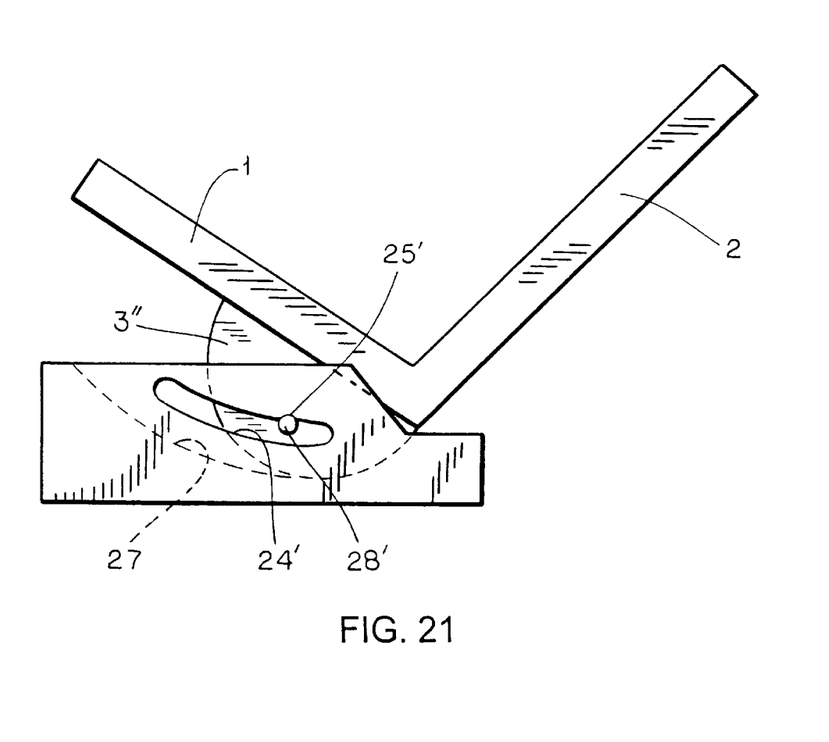
FIG. 21 is a view showing a state of the seat for vehicles depicted in FIG. 19 at the time of a rear-end collision.

When the vehicle is hit by another vehicle from behind, the upper half of the body of the occupant pushes the back portion 2 backwardly by recoil. Accordingly, the sliders 3' rotate backwardly on the respective guide surfaces 27, so that the short holes 25 of the respective sliders 3' are fitted to the pin 28 and the lower ends of the short holes 25 abut on the pin 28 (see FIG. 18). As a result, the seat rotates backwardly, so that the shock load transmitted to the occupant at the time of a rear-end collision is reduced. FIGS. 19, 20 and 21 are schematic views showing a seat for vehicles according to a sixth embodiment of the present invention. The seat in this embodiment is different from that of the fourth embodiment shown in FIGS. 13, 14 and 15 in that curved holes 24' are formed in the respective guides 26 and a pin 28' is attached to sliders 3".

FIG. 19 shows a normal state of the seat. In this state, the pin 28' is located in the rear end of the holes 24'. When the vehicle collides, the sliders 3" climb over slide prevention means not shown and are guided by the pin 28' and the holes 24' so that the sliders 3" rotate backwardly while moving forwardly along the respective guide surfaces 27 (see FIG. 20).

When the vehicle is hit by another vehicle from behind, the upper half of the body of the occupant pushes the back portion 2 backwardly by recoil. Accordingly, as shown in FIG. 21, the sliders 3" rotate backwardly on the respective guide surfaces 27, so that the pin 28 abuts on step portions 25' of the holes 24'.

Because the seat for vehicles according to the present invention rotates so as to be inclined at the time of a collision, the occupant can be prevented from being thrown forwardly. Further, because the seat rotates backwardly also when the vehicle is run into from behind, that is, at the time of a rear-end collision, the shock load due to the rear-end collision is reduced. Further, because the seat is moved by inertia force, the seat can immediately respond to impact force at the time of a collision with no time lag. Further, because it is not necessary to provide any special device such as a collision sensor, a control unit, an actuator, etc., not only is the seat simple in structure and inexpensive, but also the reliability of the operation of the seat is high.

What is claimed is:

1. A seat for a vehicle comprising a seat portion and a back portion, wherein:

a slider having a forwardly and upwardly inclined surface is attached to a lower side of said seat portion;

a longitudinal guide means for frontwardly guiding said seat by a transverse horizontal pivotal shaft is provided on a vehicle body, said seat being rotatable backwardly about said pivotal shaft when said vehicle is hit by another vehicle from behind; and a slider running-on means is provided on the vehicle body so that said inclined surface of said slider runs on to said slider running-on means to rotate said seat backwardly about said pivotal shaft when the vehicle collides with another object.

2. The seat for a vehicle according to claim 1, wherein one of said slider and a member which moves together with said slider is held by pins projecting from guide surfaces and urged by springs so that said one of said slider and said member is prevented from moving forwardly, said one of said slider and said member moving together with said slider climbing over said pins against said spring so as to be able to move forwardly when a predetermined amount of inertia force in generated in said seat.

3. The seat for a vehicle according to claim 1, wherein a pin-like member is attached to one of said seat and said vehicle body in a position far from said pivotal shaft and springs are attached to the other of said seat and said vehicle body so that said pin-like member is held from its opposite sides by each of said springs.

4. The seat for a vehicle according to claim 1, further comprising a stopper for limiting the rotation of said seat.

5. The seat for a vehicle according to claim 1, wherein support members are pivotally attached to the transverse horizontal pivotal shaft, said longitudinal guide means frontwardly/rearwardly guiding said seat by frontwardly/rearwardly guiding said support members.

* * * * *